United States Patent
Mouri et al.

(10) Patent No.: US 11,878,912 B2
(45) Date of Patent: Jan. 23, 2024

(54) METHOD OF PRODUCING BORON TRICHLORIDE

(71) Applicant: SHOWA DENKO K.K., Tokyo (JP)

(72) Inventors: Saki Mouri, Tokyo (JP); Hideyuki Kurihara, Tokyo (JP)

(73) Assignee: Resonac Corporation, Tokyo (JP)

( * ) Notice: Subject to any disclaimer, the term of this patent is extended or adjusted under 35 U.S.C. 154(b) by 689 days.

(21) Appl. No.: 17/052,844

(22) PCT Filed: Jun. 4, 2019

(86) PCT No.: PCT/JP2019/022194
§ 371 (c)(1),
(2) Date: Nov. 4, 2020

(87) PCT Pub. No.: WO2020/003924
PCT Pub. Date: Jan. 2, 2020

(65) Prior Publication Data
US 2021/0246040 A1 Aug. 12, 2021

(30) Foreign Application Priority Data

Jun. 26, 2018 (JP) ................................. 2018-121137

(51) Int. Cl.
*C01B 35/06* (2006.01)
(52) U.S. Cl.
CPC ........ *C01B 35/061* (2013.01); *C01P 2004/61* (2013.01); *C01P 2006/82* (2013.01)
(58) Field of Classification Search
CPC . C01B 35/061; C01P 2004/61; C01P 2006/82
See application file for complete search history.

(56) References Cited

U.S. PATENT DOCUMENTS

| 3,025,138 A | 3/1962 | Davis et al. |
| 3,035,138 A | 5/1962 | Scarpa |
| 2015/0266744 A1 | 9/2015 | Raynor et al. |

FOREIGN PATENT DOCUMENTS

| CN | 106957061 A | 7/2017 | |
| CN | 108163868 A | 6/2018 | |
| EP | 3 476 804 A1 | 5/2019 | |
| JP | 2008-272688 A | 11/2008 | |
| JP | 2009-227517 A | 10/2009 | |
| JP | 2010-111550 A | 5/2010 | |
| TW | 201536680 | 10/2015 | |
| TW | 201808806 A | 3/2018 | |
| WO | 2005/056475 A1 | 6/2005 | |
| WO | 2017/221642 A1 | 12/2017 | |
| WO | WO-2017221642 A1 * | 12/2017 | ........... C01B 35/061 |

OTHER PUBLICATIONS

International Search Report for PCT/JP2019/022194 dated Sep. 3, 2019 [PCT/ISA/210].
Extended European Search Report dated Aug. 25, 2021 in European Application No. 19825153.0.
International Preliminary Report on Patentability dated Dec. 29, 2020 with translation of the Written Opinion from the International Bureau in International Application No. PCT/JP2019/022194.

* cited by examiner

*Primary Examiner* — Yong L Chu
(74) *Attorney, Agent, or Firm* — Sughrue Mion, PLLC

(57) ABSTRACT

A method of producing boron trichloride, which includes: a metal chlorination step of bringing a gas containing chlorine gas into contact with raw boron carbide as boron carbide including, as an impurity, a metal other than boron, and allowing the metal to react with the chlorine gas in the gas containing the chlorine gas, to form a metal chloride and to obtain boron carbide containing the metal chloride; a removal step of removing the metal chloride from the boron carbide containing the metal chloride, obtained in the metal chlorination step; and a generation step of bringing a gas containing chlorine gas into contact with the boron carbide from which the metal chloride has been removed in the removal step, and allowing the boron carbide and the chlorine gas in the gas containing the chlorine gas to react with each other to generate boron trichloride.

10 Claims, 1 Drawing Sheet

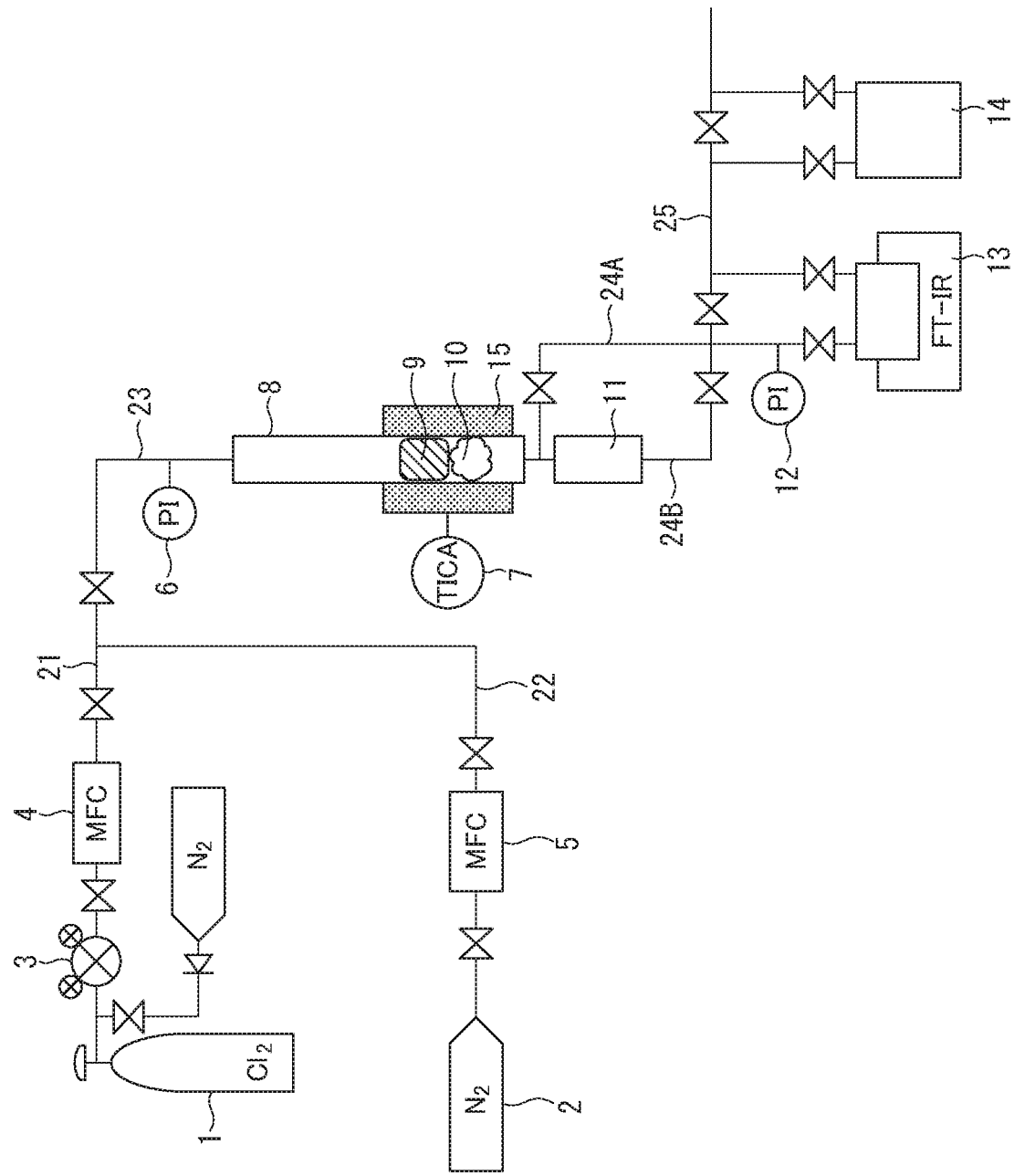

METHOD OF PRODUCING BORON TRICHLORIDE

CROSS REFERENCE TO RELATED APPLICATIONS

This application is a National Stage of International Application No. PCT/JP2019/022194 filed Jun. 4, 2019, claiming priority based on Japanese Patent Application No. 2018-121137 filed Jun. 26, 2018.

TECHNICAL FIELD

The present invention relates to a method of producing boron trichloride.

BACKGROUND ART

A method in which boron carbide ($B_4C$) is subjected to reaction with chlorine gas ($Cl_2$) and is chlorinated is known as one of methods of producing boron trichloride ($BCl_3$). The reaction can be represented by the following reaction formula.

$$B_4C + 6Cl_2 \rightarrow 4BCl_3 + C$$

However, the production method has had a problem that at the time of chlorination reaction, a dark-brown oil-like product may be produced and may result in blockage of a line of producing boron trichloride. The main constituents of the oil-like product are metal chlorides by-produced by reaction of metals such as iron (Fe) included as impurities in boron carbide, with chlorine gas. There has also been a problem that the metal chlorides in the oil-like product are mixed into boron trichloride to decrease the purity of the boron trichloride.

A technology of removing metals included in boron carbide to purify the boron carbide is disclosed in, for example, PTL 1. In the technology, an aqueous acidic solution such as hydrochloric acid, sulfuric acid, or nitric acid is brought into contact with a powder of the boron carbide to dissolve the metals, included in the boron carbide, in the aqueous acidic solution, and to remove the metals. However, application of the technology disclosed in PTL 1 to the above-described method of producing boron trichloride has had the following problem.

The aqueous acidic solution contains water. Since water decomposes boron trichloride, itis necessary to sufficiently dry the boron carbide treated with the aqueous acidic solution, followed by subjecting the boron carbide to chlorination reaction. Moreover, it is necessary to perform post-treatment of an acid mine drainage water generated by the treatment with the aqueous acidic solution. In other words, the application of the technology disclosed in PTL 1 to the above-described method of producing boron trichloride has had the problem that steps of producing boron trichloride are complicated.

CITATION LIST

Patent Literature

PTL 1: Japanese Patent Publication No. 2008-272688

SUMMARY OF INVENTION

Technical Problem

An object of the present invention is to provide a method of producing boron trichloride, in which boron trichloride with high purity can be produced in simple production steps, and blockage of a production line is inhibited.

Solution to Problem

To solve the problem, one aspect of the present invention is as the following [1] to [6].

[1] A method of producing boron trichloride, including:
a metal chlorination step of bringing a gas containing chlorine gas into contact with raw boron carbide as boron carbide including, as an impurity, a metal other than boron, at a temperature of 300° C. or more and 700° C. or less, and allowing the metal to react with the chlorine gas in the gas containing the chlorine gas, to form a metal chloride and to obtain boron carbide containing the metal chloride;
a removal step of removing the metal chloride from the boron carbide containing the metal chloride, obtained in the metal chlorination step; and
a generation step of bringing a gas containing chlorine gas into contact with the boron carbide from which the metal chloride has been removed in the removal step, and allowing the boron carbide and the chlorine gas in the gas containing the chlorine gas to react with each other to generate boron trichloride.

[2] The method of producing boron trichloride according to [1], wherein the boron carbide and the gas containing the chlorine gas are brought into contact with each other at a temperature of 550° C. or more and 1100° C. or less in the generation step.

[3] The method of producing boron trichloride according to [1] or [2], wherein the metal is at least one of iron, aluminum, calcium, chromium, silicon, and titanium.

[4] The method of producing boron trichloride according to [3], wherein the metal includes iron, and a content of iron contained in the boron carbide from which the metal chloride has been removed in the removal step is less than 0.30% by mass.

[5] The method of producing boron trichloride according to any one of [1] to [4], wherein the raw boron carbide is a powder having a D95 of 500 μm or less, measured by a laser diffraction method, and the D95 is a particle diameter in which an integrated frequency based on a smaller particle diameter in an integrated particle size distribution based on a volume is 95%.

[6] The method of producing boron trichloride according to any one of [1] to [5], wherein the gas containing the chlorine gas, used in the metal chlorination step, consists of 50% by volume or more and 100% by volume or less of the chlorine gas, and a remainder inert gas.

Advantageous Effects of Invention

In accordance with the present invention, boron trichloride with high purity can be produced in simple production steps, and blockage of a production line is inhibited.

BRIEF DESCRIPTION OF DRAWINGS

The FIGURE is a schematic view of an apparatus for producing boron trichloride, explaining a method of producing boron trichloride according to one embodiment of the present invention.

DESCRIPTION OF EMBODIMENTS

In a method in which boron trichloride is produced by allowing boron carbide and chlorine gas to react with each other, boron carbide used as a raw material (raw boron carbide) may contain, as an impurity, a metal other than boron. Examples of the metal as the impurity include iron (Fe), aluminum (Al), calcium (Ca), chromium (Cr), silicon (Si), and titanium (Ti), and at least one of these metals is contained in the form of an oxide or the like in the boron carbide. The content of iron among the metals described above may be particularly large, and the iron is considered to be derived from a ball mill used when the boron carbide is produced (pulverized).

When a metal is contained in the boron carbide, the metal as well as the boron carbide is chlorinated at the time of the chlorination reaction in which boron trichloride is produced, and therefore, a metal chloride as a by-product as well as the boron trichloride as a main product is produced. The metal chloride becomes a dark-brown oil-like product, and is precipitated at a cooling point on a line of producing boron trichloride. Therefore, the metal chloride may cause blockage of the production line if being accumulated.

When iron(III) chloride ($FeCl_3$), aluminum chloride (AlCl), titanium(IV) chloride ($TiCl_4$), silicon tetrachloride ($SiCl_4$), or the like is by-produced by the chlorination of the metal, such a metal chloride may also be mixed into the gaseous product of the boron trichloride, and therefore, the purity of the product may be decreased.

As a result of intensive examination, the present inventors found a method in which a metal chloride by-produced by chlorination reaction of a metal contained as an impurity in boron carbide is removed in a simple step to enable production of boron trichloride with high purity when the boron carbide and chlorine gas are allowed to react with each other to produce the boron trichloride, and the present invention was thus accomplished.

One embodiment of the present invention will be described below. The present embodiment describes an example of the present invention, and the present invention is not limited to the present embodiment. Moreover, various modifications or improvements can be made to the present embodiment, and aspects to which such modifications or improvements are made can be encompassed in the present invention. For example, materials, dimensions, and the like described as examples in the present embodiment are presented by way of example only, the present invention is not limited to the materials, the dimensions, and the like, and the materials, the dimensions, and the like can be changed, as appropriate, within a range in which the effects of the present invention are exhibited.

A method of producing boron trichloride according to the present embodiment includes: a metal chlorination step of bringing a gas containing chlorine gas into contact with raw boron carbide as boron carbide including, as an impurity, a metal other than boron, and allowing the metal to react with the chlorine gas in the gas containing the chlorine gas, to form a metal chloride and to obtain boron carbide containing the metal chloride; a removal step of removing the metal chloride from the boron carbide containing the metal chloride, obtained in the metal chlorination step; and a generation step of bringing a gas containing chlorine gas into contact with the boron carbide from which the metal chloride has been removed in the removal step, and allowing the boron carbide and the chlorine gas in the gas containing the chlorine gas to react with each other to generate boron trichloride.

[Metal Chlorination Step]

The metal chlorination step is a step in which a gas containing chlorine gas is brought into contact with raw boron carbide, to chlorinate a metal while suppressing chlorination of boron carbide and to form a metal chloride, and the boron carbide containing the metal chloride is obtained. A method in which the metal in the raw boron carbide is selectively chlorinated while suppressing the chlorination of the boron carbide is not particularly limited, and examples of the method include a method in which chlorination reaction is performed under reaction conditions in which the chlorination of the boron carbide is inhibited and the chlorination of the metal easily occurs.

For example, with regard to a reaction temperature, when the raw boron carbide and the gas containing the chlorine gas are brought into contact with each other at a temperature of 300° C. or more and 700° C. or less in the metal chlorination step, the metal can be preferentially chlorinated while suppressing the chlorination of the boron carbide, to form the metal chloride. When the reaction temperature in the metal chlorination step is outside the temperature range described above, it may be impossible to sufficiently exhibit the effects that boron trichloride with high purity can be produced in simple production steps and the blockage of a production line is inhibited, because the chlorination of the boron carbide may occur or the chlorination of the metal may be insufficient.

The temperature at which the chlorination of the boron carbide is suppressed and the metal is preferentially chlorinated is a temperature at which the generation of the metal chloride can be confirmed as soil with a color such as dark brown, brown, or yellow, and the concentration of boron trichloride in produced gas is less than 0.1% by mass. Such a temperature is commonly 300° C. or more and 700° C. or less. However, a temperature of more than 500° C. may cause occurrence of the reaction of generation of a small amount of boron trichloride in the metal chlorination step, and therefore leads to loss of the production of boron trichloride. Thus, the temperature at which the raw boron carbide and the gas containing the chlorine gas are brought into contact with each other in the metal chlorination step is more preferably set at 300° C. or more and 500° C. or less.

In the metal chlorination step, the raw boron carbide is placed in a reaction container in which the metal in the raw boron carbide is chlorinated while suppressing the chlorination of the boron carbide, and the gas containing the chlorine gas is introduced into the reaction vessel. However, the gas containing the chlorine gas at ordinary temperature may be introduced into the reaction vessel, or the gas containing the chlorine gas heated to a high temperature (for example, 300° C. or more and 700° C. or less) may be introduced into the reaction vessel.

The chlorination in the metal chlorination step can be performed under a pressure environment of which the pressure is not more than atmospheric pressure, and is preferably performed under a pressure environment of which the pressure is 0.09 MPa or more and 0.11 MPa or less. A pressure of 0.09 MPa or more results in the favorable efficiency of contact between the raw boron carbide and the gas containing the chlorine gas, while a pressure of 0.11 MPa or less causes the airtightness of the reaction container to be easily kept.

The flow rate of the gas containing the chlorine gas, used in the metal chlorination step, is not particularly limited, but the flow rate (linear velocity) of the chlorine gas can be set at 0.5 m/min or more and 2.5 m/min or less.

As the gas containing the chlorine gas, used in the metal chlorination step, a mixed gas consisting of 50% by volume or more and less than 100% by volume of the chlorine gas and the remainder inert gas can be used, and 100% by volume of the chlorine gas containing no inert gas can also be used. The kind of the inert gas usable as the mixed gas is not particularly limited, and examples of the inert gas include nitrogen gas, argon, and helium.

The raw boron carbide is preferably a powder having a D95 of 3 μm or more and 500 μm or less, and more preferably a powder having a D95 of 5 μm or more and 100 μm or less, the D95 being measured by a laser diffraction method. Use of such raw boron carbide as described above results in the increased rate of reaction with chlorine gas, and therefore causes the favorable efficiency of generation of boron trichloride in the generation step described below.

The D95 is a particle diameter in which an integrated frequency based on a smaller particle diameter in an integrated particle size distribution based on a volume is 95%.

[Removal Step]

The removal step is a step in which the metal chloride is removed from the boron carbide containing the metal chloride, obtained in the metal chlorination step. Before generation of boron trichloride, it is easy to separate the metal chloride from the boron carbide, and therefore, it is possible to sufficiently remove the metal from the boron carbide in a simple step.

A method in which the metal chloride is removed from the boron carbide is not particularly limited. However, the metal chloride can be separated from the boron carbide by keeping the boron carbide containing the metal chloride at high temperature, and vaporizing the metal chloride, for example, in a case in which the metal chloride is a compound that is vaporized at relatively low temperature, such as iron(III) chloride, aluminum chloride, titanium(IV) chloride, or silicon tetrachloride.

In the method in which the metal chloride is vaporized, the metal chloride can be very easily separated from the boron carbide, and therefore, it is not necessary to dry the boron carbide after removal of the metal and to perform post-treatment of waste liquid, like the conventional technology described above. In other words, the metal can be removed from the boron carbide by the very simple step. Thus, all the steps of producing boron trichloride can be allowed to be very simple steps.

A temperature at which the boron carbide containing the metal chloride is kept may be set at not less than a temperature at which the metal chloride is vaporized. When the raw boron carbide and the gas containing the chlorine gas are brought into contact with each other at a temperature of 300° C. or more and 700° C. or less to chlorinate the metal in the metal chlorination step, the metal chloride generated by the chlorination is vaporized at the temperature to remove the metal from the boron carbide. In other words, the metal chlorination step and the removal step proceed simultaneously.

However, when the temperature at which the boron carbide containing the metal chloride is kept is less than 300° C., the metal chloride (for example, iron(III) chloride) may be insufficiently vaporized, and therefore, the metal may be insufficiently removed from the boron carbide. Thus, the temperature at which the boron carbide containing the metal chloride is kept in the removal step is more preferably set at 400° C. or more.

In the removal step, it is preferable to remove the metal chloride from the boron carbide so that the total content of the metal other than boron contained in the boron carbide from which the metal chloride has been removed is less than 0.30% by mass, preferably 0.25% by mass or less, and still more preferably 0.20% by mass or less, and it is preferable to remove the metal chloride from the boron carbide so that the content of iron contained in the boron carbide from which the metal chloride has been removed is less than 0.30% by mass, preferably 0.25% by mass or less, and still more preferably 0.20% by mass or less. Then, it becomes easy to obtain boron trichloride with high purity.

The vaporization of the metal chloride in the removal step can be performed under a pressure environment of which the pressure is not more than atmospheric pressure, and is preferably performed under a pressure environment of which the pressure is 0.09 MPa or more and 0.11 MPa or less. A pressure of 0.09 MPa or more causes the metal chloride to be easily removed, while a pressure of 0.11 MPa or less causes the airtightness of a container, in which the removal step is performed, to be easily kept.

[Generation Step]

The generation step is a step in which a gas containing chlorine gas is brought into contact with the boron carbide from which the metal chloride has been removed in the removal step, and the boron carbide and the chlorine gas in the gas containing the chlorine gas are allowed to react with each other to generate boron trichloride.

The boron carbide from which the metal has been sufficiently removed can be chlorinated to produce boron trichloride by performing the reaction of chlorinating the metal and the reaction of chlorinating the boron carbide as separate steps. Therefore, the amount of the metal chloride existing in a reaction system is minute in the generation step. Therefore, boron trichloride with high purity can be produced in the simple production steps, and blockage of a production line is inhibited.

A temperature at which the boron carbide and the gas containing the chlorine gas are brought into contact with each other in the generation step is not particularly limited as long as boron trichloride is generated. However, the temperature is preferably 550° C. or more and 1100° C. or less, more preferably 800° C. or more and 1100° C. or less, and still more preferably 900° C. or more and 1000° C. or less. When the temperature at which the boron carbide and the gas containing the chlorine gas are brought into contact with each other in the generation step is the temperature described above, the rate of generating boron trichloride is sufficiently high, and damage to a reaction container, in which the reaction of the generation step is performed, and to a member around the reaction container is inhibited.

The gas containing the chlorine gas, used in the generation step, can be allowed to be a mixed gas consisting of 50% by volume or more and less than 100% by volume of the chlorine gas and the remainder inert gas, and is preferably allowed to be 100% by volume of the chlorine gas containing no inert gas. When the mixed gas in which the chlorine gas is diluted with the inert gas is used as the gas containing the chlorine gas, generated boron trichloride and the inert gas coexist, and it is necessary to separate the boron trichloride and the inert gas. The kind of the inert gas is not particularly limited, and examples of the inert gas include nitrogen gas, argon, and helium.

In the generation step and the metal chlorination step, the same kind of a gas containing chlorine gas may be used, or the different kinds of gases containing chlorine gas may be used. In other words, the proportions of the chlorine gas in the gases containing the chlorine gas in the generation step and the metal chlorination step may be the same or different.

All the three steps of the metal chlorination step, the removal step, and the generation step may be performed in the same reaction container, or some or all of the three steps may be performed in separate reaction containers. When the boron carbide is transferred to another reaction container after the end of the metal chlorination step, the transfer manipulation is preferably performed under a dry environment, such as in a glove box. The materials of the reaction containers used in the three steps are not particularly limited as long as the materials are not corroded by chlorine gas, boron trichloride, hydrogen chloride, or the like. The materials may be, for example, graphite, a metal, and ceramic.

The boron trichloride produced by the method of producing boron trichloride of the present embodiment may contain oxygen gas, nitrogen gas, carbon dioxide, carbon monoxide, methane, hydrogen gas, helium, hydrogen chloride, silicon tetrachloride, and/or the like as impurities other than the boron trichloride. The impurities can be removed by common distillation.

The method of producing boron trichloride of the present embodiment will be described in more detail below with reference to the FIGURE illustrating an example of an apparatus for producing boron trichloride. In the FIGURE, enlarged principal units may be illustrated for convenience in description to facilitate understanding of the features of the present invention, and it is possible that the dimensional ratio and the like of each component illustrated in the FIGURE are not the same as those of the actual apparatus for producing boron trichloride.

The apparatus for producing boron trichloride illustrated in the FIGURE includes a chlorine gas container 1 (for example, a cylinder) filled with chlorine gas, a nitrogen gas container 2 (for example, a cylinder) filled with nitrogen gas as an inert gas, a pipe-shaped reaction container 8 made of quartz, in which a powder 9 of boron carbide (raw boron carbide) is loaded, a Fourier transform infrared spectroscopic apparatus 13 capable of analyzing boron trichloride, moisture, hydrogen chloride, and the like in gas, and a collection container 14 configured to liquefy and collect generated gaseous boron trichloride.

A reaction unit in which a reaction such as chlorination reaction is performed is disposed in the interior of the pipe-shaped reaction container 8. In the reaction unit, the powder 9 of boron carbide (raw boron carbide) is loaded while being supported on a quartz wool 10. The temperature of the reaction unit is controlled by a heater 7, and kept by covering the reaction unit with a heat insulating material 15.

When boron trichloride is produced, first, chlorine gas is introduced from the chlorine gas container 1 into the pipe-shaped reaction container 8 through pipes 21 and 23. In such a case, the flow rate of the chlorine gas is adjusted by a mass flow controller 4 while adjusting the supply pressure of the chlorine gas by a regulator 3.

When a mixed gas in which the chlorine gas is diluted with the inert gas is introduced into the pipe-shaped reaction container 8, the chlorine gas and the nitrogen gas are mixed in the intermediate portion of the pipe 21 (i.e., in a more upstream side than the pipe-shaped reaction container 8), and the mixed gas prepared in the pipe 21 is introduced into the pipe-shaped reaction container 8 through the pipe 23.

In other words, a pipe 22 through which the nitrogen gas container 2 and the intermediate portion of the pipe 21 communicate with each other is arranged so that the nitrogen gas is introduced from the nitrogen gas container 2 into the intermediate portion of the pipe 21 through the pipe 22 to mix the chlorine gas and the nitrogen gas. In such a case, the flow rate of the nitrogen gas can be adjusted by a mass flow controller 5, and therefore, the proportion of the chlorine gas in the mixed gas can be adjusted by the mass flow controller 5.

The powder 9 of boron carbide (raw boron carbide) is loaded in the reaction unit of the pipe-shaped reaction container 8. In the metal chlorination step and the removal step, the powder 9 of boron carbide (raw boron carbide) is heated to a temperature at which reaction between boron carbide and chlorine gas is inhibited (300° C. or more and 700° C. or less) by the heater 7. Since the chlorine gas is introduced into the reaction unit and brought into contact with the powder 9 of boron carbide (raw boron carbide), a metal contained in the powder 9 of boron carbide (raw boron carbide) preferentially reacts with the chlorine gas and is chlorinated to generate a metal chloride while suppressing the chlorination of the boron carbide (metal chlorination step).

The metal chlorination step may be performed under a pressure environment at atmospheric pressure, or may be performed under a pressure environment of which the pressure is lower than the atmospheric pressure. When the metal chlorination step is performed under the pressure environment of which the pressure is lower than the atmospheric pressure, the pressure of the interior of the apparatus for producing boron trichloride is preferably decreased using a vacuum pump which is not illustrated. The pressure in the pipe-shaped reaction container 8 can be measured by a pressure gauge 6.

When the generated metal chloride is a compound, such as, for example, iron(III) chloride, aluminum chloride, titanium(IV) chloride, or silicon tetrachloride, which is vaporized at relatively low temperature, the metal chloride is vaporized in the reaction unit of the pipe-shaped reaction container 8 immediately after the generation of the metal chloride, and is separated from the boron carbide (removal step). In other words, in the case of the present embodiment, the metal chlorination step and the removal step proceed simultaneously. As a result, the metal is removed from the boron carbide in the pipe-shaped reaction container 8.

In the metal chlorination step and the removal step, open/close control of a valve disables flow through a pipe 24A and enables flow through a pipe 24B, and therefore, the vaporized metal chloride is supplied to a cooling unit 11 by the chlorine gas, cooled, and liquefied or solidified. The gas from which the metal chloride has been removed by the liquefaction or the solidification passes through the Fourier transform infrared spectroscopic apparatus 13, and is then supplied to the outside of the apparatus for producing boron trichloride through a pipe 25. In such a case, the gas is supplied to the outside of the apparatus for producing boron trichloride without passing through the collection container 14.

After the completion of the removal of the metal from the powder 9 of boron carbide (raw boron carbide), the introduction of the chlorine gas from the chlorine gas container 1 is stopped, the gas flowing through the interior of the apparatus for producing boron trichloride is set at only the nitrogen gas, and the gas in the pipe-shaped reaction container 8 is replaced with the nitrogen gas. The reaction unit is heated by the heater 7, and the temperature of the powder 9 of boron carbide is increased to a temperature (for example, 550° C. or more and 1100° C. or less) that is not less than a generation start temperature at which generation of boron trichloride starts, by reaction between the boron carbide and the chlorine gas.

When the temperature of the powder 9 of boron carbide reaches a temperature that is not less than the generation start temperature described above, the introduction of the nitrogen gas is stopped, and the chlorine gas is reintroduced from the chlorine gas container 1 into the pipe-shaped reaction container 8. In such a case, reaction between the boron carbide and the chlorine gas starts, and boron trichloride is generated (generation step). The generated boron trichloride is in gaseous form at temperature in the pipe-shaped reaction container 8 in the generation step, and is therefore supplied from the pipe-shaped reaction container 8 to a downstream side by the chlorine gas.

In the generation step, open/close control of the valve enables flow through the pipe 24A and disables flow through the pipe 24B, and therefore, the gaseous boron trichloride is supplied to the Fourier transform infrared spectroscopic apparatus 13 by the chlorine gas, and is analyzed. The purity, yield amount, yield rate, and the like of the boron trichloride can be calculated by analyzing the boron trichloride in the gas.

The gas that has passed through the Fourier transform infrared spectroscopic apparatus 13 is supplied to the collection container 14 through the pipe 25. In the collection container 14, the gas is cooled to, for example, around 0° C., to liquefy the boron trichloride. Therefore, the boron trichloride and the chlorine gas are separated from each other, the boron trichloride is collected in the collection container 14, and the chlorine gas is supplied to the outside of the apparatus for producing boron trichloride through the pipe 25. The pressures in the pipes 24A, 24B, and 25 can be measured by a pressure gauge 12.

EXAMPLES

Examples and Comparative Examples will be described below, and the present invention will be described in more detail. Various analysis values and the like in Examples and Comparative Examples were measured by the following methods. The particle diameter D95 of a powder of raw boron carbide was measured by a wet laser diffraction scattering method. D95 is a particle diameter in which an integrated frequency based on a smaller particle diameter in an integrated particle size distribution based on a volume is 95%. An apparatus used for measuring the particle diameter D95 is a laser diffraction/scattering-type particle size distribution measurement apparatus "MICROTRAC" manufactured by MicrotracBEL Corp. Measurement conditions are as follows.

Measurement time: 30 seconds
Particle permeability: permeation
Particle refractive index: 2.00
Particle shape: nonspherical
Solvent name: ethanol
Solvent refractive index: 1.36
Measurement range: 0.021 to 1408 μm The content of a metal other than boron was measured by high-frequency inductively-coupled plasma atomic emission spectrometry (ICP emission spectrometry).

The concentration of boron trichloride and the amount of the generated boron trichloride were measured by a Fourier transform infrared spectroscopic apparatus manufactured by THERMO FISHER SCIENTIFIC.

Material of window plate: barium fluoride ($BaF_2$)
Cell length: 10 cm
Data interval: 0.964 $cm^{-1}$,
Number of times of scanning: 16
Wave number used for analysis: 1908 $cm^{-1}$ The yield rate of boron trichloride was calculated by calculating the proportion of the actual amount of generated boron trichloride to the theoretical amount of generated boron trichloride, calculated from the amount of loaded raw boron carbide.

Example 1

A powder of raw boron carbide and a gas containing chlorine gas were allowed to react with each other, to produce boron trichloride, by performing manipulation similar to the manipulation of the embodiment described above, using an apparatus for producing boron trichloride, of which the configuration was similar to that of the apparatus for producing boron trichloride in the FIGURE.

A commercially available high-purity chlorine gas having a purity of 99.999% by volume and a moisture content of 0.9 ppm by volume was used as the gas containing chlorine gas.

A boron carbide powder having a D95 of 48 μm, measured by a laser diffraction method, was used as the powder of raw boron carbide. The kinds and contents of metals other than boron, contained in the powder of raw boron carbide, are as follows: 0.30% by mass of iron, 0.027 by mass of aluminum, 0.037% by mass of calcium, 0.012% by mass of chromium, and 0.78% by mass of silicon.

In a pipe-shaped reaction container made of quartz, 0.3 g of the powder of raw boron carbide was loaded. The temperature of the powder of raw boron carbide was increased to 450° C. for 15 minutes while supplying nitrogen gas at a flow rate of 125.6 ccm ($cm^3$/min) to the pipe-shaped reaction container. Then, the gas supplied to the pipe-shaped reaction container was changed from the nitrogen gas to the above-described gas containing chlorine gas (high-purity chlorine gas), the metals contained in the powder of raw boron carbide and the chlorine gas were allowed to react with each other, to chlorinate the metals and to form metal chlorides, by supplying the gas containing chlorine gas at ordinary temperature to the pipe-shaped reaction container for 1 hour under atmospheric pressure (at a flow rate of 125.6 ccm at ordinary temperature). The generated metal chlorides were vaporized at 450° C., and removed from the powder of the boron carbide.

During the chlorination reaction described above, exhaust gas exhausted from the pipe-shaped reaction container was introduced into a Fourier transform infrared spectrometer, and the infrared spectrophotometry of the exhaust gas was performed. The chlorination reaction was performed while confirming that the concentration of boron trichloride in the exhaust gas during the chlorination reaction was not more than 0.02% by volume. After the end of the chlorination reaction, the gas supplied to the pipe-shaped reaction container was changed from the gas containing chlorine gas to nitrogen gas, and the gas in the pipe-shaped reaction container was replaced with the nitrogen gas by supplying the nitrogen gas at a flow rate of 125.6 ccm at ordinary temperature to the pipe-shaped reaction container for 10 minutes. Then, the powder of the boron carbide was sampled from the pipe-shaped reaction container, and the content of iron was measured by inductively coupled plasma atomic emission spectroscopy. As a result, the content of iron in the boron carbide was 0.10% by mass.

Subsequently, the temperature of the powder of the boron carbide was increased to 900° C. for 30 minutes while supplying nitrogen gas at a flow rate of 125.6 ccm at ordinary temperature to the pipe-shaped reaction container. Then, the gas supplied to the pipe-shaped reaction container was changed from the nitrogen gas to the gas containing chlorine gas, and the boron carbide and the chlorine gas were allowed to react with each other to generate boron trichloride by supplying the gas containing chlorine gas at ordinary temperature for 10 minutes under atmospheric pressure (at a flow rate of 125.6 ccm).

During the reaction of the generation of the boron trichloride, colored soil thought to be a metal chloride was not seen on the production line of the apparatus for producing boron trichloride, and the production line of the apparatus for producing boron trichloride was not blockaded. The generated boron trichloride was collected in the collection container of the apparatus for producing boron trichloride at 0° C., and subjected to inductively coupled plasma atomic emission spectroscopy. As a result, in the generated boron trichloride, the content of iron was 50 ppb by mass, and the content of aluminum was 6 ppb by mass. Moreover, the yield rate of the boron trichloride was 98%.

mass, and the content of aluminum was 6 ppb by mass. Moreover, the yield rate of the boron trichloride was 98%.

Example 4

Boron trichloride was produced in a manner similar to the manner of Example 1 except that a gas containing chlorine gas, used in the reaction of chlorination of metals contained in a powder of raw boron carbide, and a gas containing chlorine gas, used in the reaction of chlorination of boron carbide, were mixed gases in which chlorine gas was diluted with nitrogen gas. The concentrations of the chlorine gas in the mixed gases were set at 50% by volume.

As a result, the content of iron in the boron carbide from which metal chlorides had been removed was 0.20% by mass. During the reaction of the generation of the boron trichloride, brown pale soil thought to be a metal chloride was seen on the production line of an apparatus for producing boron trichloride (the downstream opening of a pipe-shaped reaction container), but the production line of the apparatus for producing boron trichloride was not blockaded. Further, in the generated boron trichloride, the content of iron was 100 ppb by mass, and the content of aluminum was 6 ppb by mass. moreover, the yield rate of the boron trichloride was 98%.

|  |  | Examples | | | | | | | | Comparative Examples | | |
|---|---|---|---|---|---|---|---|---|---|---|---|---|
|  |  | 1 | 2 | 3 | 4 | 5 | 6 | 7 | 8 | 1 | 2 | 3 |
|  | D95 of Raw Boron Carbide (μm) | 48 | 48 | 48 | 48 | 48 | 100 | 500 | 1 to 3 mm | 48 | 48 | 48 |
| Metal Chlorination Step | Temperature (° C.) | 450 | 300 | 375 | 450 | 450 | 450 | 450 | 450 | — | 250 | 750 |
|  | Time (h) | 1 | 1 | 1 | 1 | 3 | 1 | 1 | 1 | — | 1 | 1 |
|  | Concentration of Chlorine Gas in Gas Containing Chlorine Gas (% by volume) | 100 | 100 | 100 | 50 | 100 | 100 | 100 | 100 | — | 100 | 100 |
|  | Content of Iron (% by mass) | 0.10 | 0.22 | 0.16 | 0.20 | 0.13 | 0.10 | 0.10 | 0.13 | 0.30 | 0.30 | — |
| Generation Step | Temperature (° C.) | 900 | 900 | 900 | 900 | 900 | 900 | 900 | 900 | 900 | 900 | 900 |
|  | Concentration of Chlorine Gas in Gas Containing Chlorine Gas (% by volume) | 100 | 100 | 100 | 50 | 100 | 100 | 100 | 100 | 100 | 100 | 100 |
|  | Soil on Production Line | Absent | Absent | Absent | Pale Soil | Absent | Absent | Absent | Absent | Deep-Colored Soil | Present | Absent |
|  | Content of Iron (ppb by mass) | 50 | 100 | 80 | 100 | 60 | 60 | 60 | 70 | 3000 | 3000 | — |
|  | Content of Aluminum (ppb by mass) | 6 | 6 | 6 | 6 | 6 | 6 | 6 | 6 | 270 | 6 | — |
|  | Yield Rate of Boron Trichloride (%) | 98 | 98 | 98 | 98 | 98 | 95 | 90 | 30 | 98 | 98 | <10 |

Example 2

Boron trichloride was produced in a manner similar to the manner of Example 1 except that a temperature at which metals contained in a powder of raw boron carbide and chlorine gas were allowed to react with each other to chlorinate the metals, and a temperature at which metal chlorides were removed were set at 300° C. As a result, the content of iron in the boron carbide from which the metal chlorides had been removed was 0.22% by mass. During the reaction of the generation of the boron trichloride, colored soil thought to be a metal chloride was not seen on the production line of an apparatus for producing boron trichloride, and the production line of the apparatus for producing boron trichloride was not blockaded. Further, in the generated boron trichloride, the content of iron was 100 ppb by mass, and the content of aluminum was 6 ppb by mass. Moreover, the yield rate of the boron trichloride was 98%.

Example 3

Boron trichloride was produced in a manner similar to the manner of Example 1 except that a temperature at which metals contained in a powder of raw boron carbide and chlorine gas were allowed to react with each other to chlorinate the metals, and a temperature at which metal chlorides were removed were set at 375° C. As a result, the content of iron in the boron carbide from which the metal chlorides had been removed was 0.16 by mass. During the reaction of the generation of the boron trichloride, colored soil thought to be a metal chloride was not seen on the production line of an apparatus for producing boron trichloride, and the production line of the apparatus for producing boron trichloride was not blockaded. Further, in the generated boron trichloride, the content of iron was 80 ppb by

Example 5

Boron trichloride was produced in a manner similar to the manner of Example 1 except that time for which a powder of raw boron carbide and a gas containing chlorine gas were brought into contact with each other was set at 3 hours. As a result, the content of iron in the boron carbide from which the metal chlorides had been removed was 0.13% by mass. During the reaction of the generation of the boron trichloride, colored soil thought to be a metal chloride was not seen on the production line of an apparatus for producing boron trichloride, and the production line of the apparatus for producing boron trichloride was not blockaded. Further, in the generated boron trichloride, the content of iron was 60 ppb by mass, and the content of aluminum was 6 ppb by mass. Moreover, the yield rate of the boron trichloride was 98%.

Example 6

Boron trichloride was produced in a manner similar to the manner of Example 1 except that the particle diameter D95 of a powder of raw boron carbide was 100 μm. As a result, the content of iron in the boron carbide from which the metal chlorides had been removed was 0.10% by mass. During the reaction of the generation of the boron trichloride, colored soil thought to be a metal chloride was not seen on the production line of an apparatus for producing boron trichloride, and the production line of the apparatus for producing boron trichloride was not blockaded. Further, in the generated boron trichloride, the content of iron was 60 ppb by mass, and the content of aluminum was 6 ppb by mass. Moreover, the yield rate of the boron trichloride was 95%.

Example 7

Boron trichloride was produced in a manner similar to the manner of Example 1 except that the particle diameter D95 of a powder of raw boron carbide was 500 μm. As a result, the content of iron in the boron carbide from which the metal chlorides had been removed was 0.10% by mass. During the reaction of the generation of the boron trichloride, colored soil thought to be a metal chloride was not seen on the production line of an apparatus for producing boron trichloride, and the production line of the apparatus for producing boron trichloride was not blockaded. Further, in the generated boron trichloride, the content of iron was 60 ppb by mass, and the content of aluminum was 6 ppb by mass. Moreover, the yield rate of the boron trichloride was 90%.

Example 8

Boron trichloride was produced in a manner similar to the manner of Example 1 except that a powder of raw boron carbide passed through a dry sieve having an opening of 5.60 mm, a dry residue on a sieve having an opening of 3.35 mm was not more than 20% by mass, and a dry residue on a sieve having an opening of 1 mm was not less than 65% by mass.

As a result, the content of iron in the boron carbide from which the metal chlorides had been removed was 0.13% by mass. During the reaction of the generation of the boron trichloride, colored soil thought to be a metal chloride was not seen on the production line of an apparatus for producing boron trichloride, and the production line of the apparatus for producing boron trichloride was not blockaded. Further, in the generated boron trichloride, the content of iron was 70 ppb by mass, and the content of aluminum was 6 ppb by mass. Moreover, the yield rate of the boron trichloride was 30%.

Comparative Example 1

Boron trichloride was produced in a manner similar to the manner of Example 1 except that metals contained in a powder of raw boron carbide were not chlorinated, and the raw boron carbide from which the metals had not been removed was allowed to react with chlorine gas to chlorinate the boron carbide. The content of iron in the powder of raw boron carbide from which the metals had not been removed was 0.30% by mass.

During the reaction of the generation of the boron trichloride, dark-brown, deep-colored soil thought to be a metal chloride was seen on the production line of an apparatus for producing boron trichloride (the downstream opening of a pipe-shaped reaction container), but the production line of the apparatus for producing boron trichloride was not blockaded for a reaction time of 10 minutes. Further, in the generated boron trichloride, the content of iron was 3 ppm by mass, and the content of aluminum was 270 ppb by mass. Moreover, the yield rate of the boron trichloride was 98%.

Comparative Example 2

Boron trichloride was produced in a manner similar to the manner of Example 1 except that a temperature at which metals contained in a powder of raw boron carbide and chlorine gas were allowed to react with each other to chlorinate the metals, and a temperature at which metal chlorides were removed were set at 250° C. As a result, the content of iron in powder of the boron carbide was 0.30% by mass.

During the reaction of the generation of the boron trichloride, dark-brown soil thought to be a metal chloride was seen on the production line of an apparatus for producing boron trichloride (the downstream opening of a pipe-shaped reaction container), but the production line of the apparatus for producing boron trichloride was not blockaded. Further, in the generated boron trichloride, the content of iron was 3 ppm by mass, and the content of aluminum was 6 ppb by mass. Moreover, the yield rate of the boron trichloride was 98%.

Comparative Example 3

Boron trichloride was produced in a manner similar to the manner of Example 1 except that a temperature at which metals contained in a powder of raw boron carbide and chlorine gas were allowed to react with each other to chlorinate the metals, and a temperature at which metal chlorides were removed were set at 750° C. However, the boron carbide and the chlorine gas reacted with each other to generate boron trichloride in a step of allowing the metals contained in the powder of raw boron carbide and the chlorine gas to react with each other to chlorinate the metals, and the concentration of boron trichloride in generated gas (exhaust gas exhausted from a pipe-shaped reaction container) was 90% by volume.

During the reaction of the generation of the boron trichloride, soil thought to be a metal chloride was not seen on the production line of an apparatus for producing boron trichloride (the downstream opening of a pipe-shaped reaction container), but almost no boron trichloride was generated because most of the loaded boron carbide had already reacted. The yield rate of the boron trichloride was less than 10%.

REFERENCE SIGNS LIST

1 Chlorine gas container
2 Nitrogen gas container
8 Pipe-shaped reaction container
9 Powder of boron carbide
11 Cooling unit
13 Fourier transform infrared spectroscopic apparatus
14 Collection container

The invention claimed is:
1. A method of producing boron trichloride, including:

a metal chlorination step of bringing a gas containing chlorine gas into contact with raw boron carbide as boron carbide comprising, as an impurity, a metal other than boron, at a temperature of 300° C. or more and 700° C. or less, and allowing the metal to react with the chlorine gas in the gas containing the chlorine gas, to form a metal chloride and to obtain boron carbide containing the metal chloride;

a removal step of removing the metal chloride from the boron carbide containing the metal chloride, obtained in the metal chlorination step; and a generation step of bringing a gas containing chlorine gas into contact with the boron carbide from which the metal chloride has been removed in the removal step, and allowing the boron carbide and the chlorine gas in the gas containing the chlorine gas to react with each other to generate boron trichloride wherein the boron carbide and the gas containing the chlorine gas are brought into contact with each other at a temperature of 550° C. or more and 1100° C. or less in the generation step.

2. The method of producing boron trichloride according to claim 1, wherein the metal is at least one of iron, aluminum, calcium, chromium, silicon, and titanium.

3. The method of producing boron trichloride according to claim 2, wherein the metal comprises iron, and a content of iron contained in the boron carbide from which the metal chloride has been removed in the removal step is less than 0.30% by mass.

4. The method of producing boron trichloride according to claim 1, wherein the raw boron carbide is a powder having a D95 of 500 μm or less, measured by a laser diffraction method, and the D95 is a particle diameter in which an integrated frequency based on a smaller particle diameter in an integrated particle size distribution based on a volume is 95%.

5. The method of producing boron trichloride according to claim 1, wherein the gas containing the chlorine gas, used in the metal chlorination step, consists of 50% by volume or more and 100% by volume or less of the chlorine gas, and a remainder inert gas.

6. The method of producing boron trichloride according to claim 2, wherein the raw boron carbide is a powder having a D95 of 500 μm or less, measured by a laser diffraction method, and the D95 is a particle diameter in which an integrated frequency based on a smaller particle diameter in an integrated particle size distribution based on a volume is 95%.

7. The method of producing boron trichloride according to claim 3, wherein the raw boron carbide is a powder having a D95 of 500 μm or less, measured by a laser diffraction method, and the D95 is a particle diameter in which an integrated frequency based on a smaller particle diameter in an integrated particle size distribution based on a volume is 95%.

8. The method of producing boron trichloride according to claim 2, wherein the gas containing the chlorine gas, used in the metal chlorination step, consists of 50% by volume or more and 100% by volume or less of the chlorine gas, and a remainder inert gas.

9. The method of producing boron trichloride according to claim 3, wherein the gas containing the chlorine gas, used in the metal chlorination step, consists of 50% by volume or more and 100% by volume or less of the chlorine gas, and a remainder inert gas.

10. The method of producing boron trichloride according to claim 4, wherein the gas containing the chlorine gas, used in the metal chlorination step, consists of 50% by volume or more and 100% by volume or less of the chlorine gas, and a remainder inert gas.

* * * * *